Nov. 23, 1937.  F. M. TOBIN  2,100,299
TREATMENT OF HOG CARCASSES
Filed May 6, 1937
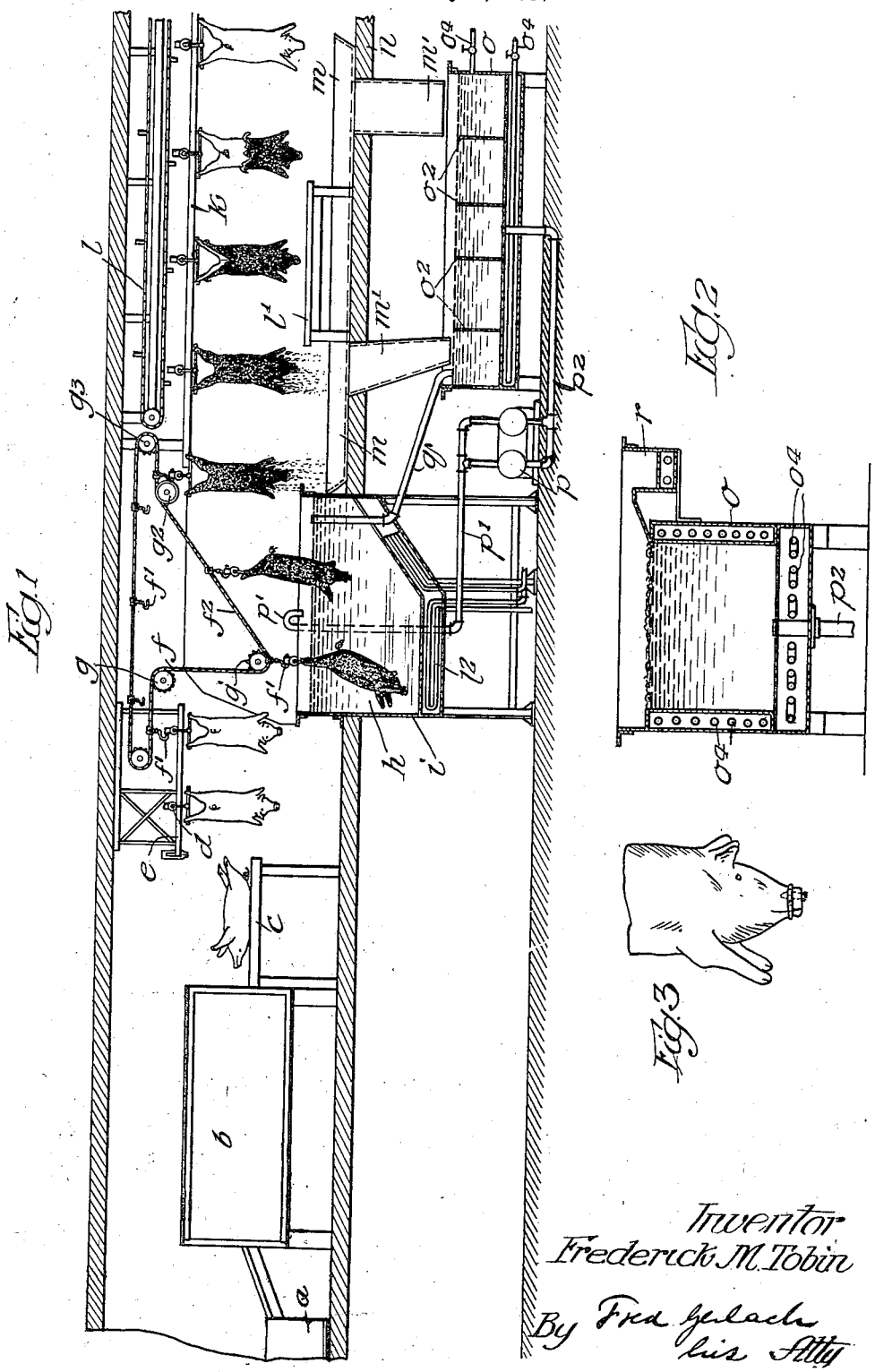
Inventor
Frederick M. Tobin
By Fred Gerlach
his Atty Patented Nov. 23, 1937

2,100,299

UNITED STATES PATENT OFFICE 2,100,299

TREATMENT OF HOG CARCASSES

Frederick M. Tobin, Rochester, N. Y., assignor to The Tobin Packing Co., Inc., Fort Dodge, Iowa, a corporation of Iowa Application May 6, 1937, Serial No. 141,031

8 Claims. (Cl. 17—45)

The present invention relates to the treatment of hog carcasses, and its primary object is to provide an improved method of treating a machine dehaired hog carcass which serves not only effectively to remove any and all remaining hairs, but also materially improves the condition and quality of the carcass for use as a human food or food-product.

Other objects of the invention and the various advantages and characteristics of the present method of treating a hog carcass will be apparent from a consideration of the following detailed description.

The invention consists in the several novel features which are hereinafter set forth and are more particularly defined by claims at the conclusion hereof.

In the drawing which accompanies and forms a part of the present specification or disclosure and in which like letters of reference denote corresponding parts throughout the several views:

Fig. 1 is a diagrammatic illustration of an apparatus or parts for carrying out the invention.

Fig. 2 is a transverse section through the melting tank for the resinous compound which is used in connection with the improved method.

Figure 3 is a side view of the head of a hog carcass showing the manner in which the nostrils are plugged and the jaws are located or secured together before dipping of the carcass in the resinous compound.

In carrying out the treatment of hog carcasses according to the invention, each carcass is first scalded in a tank $a$ at a temperature of approximately 138° F. After being scalded, the carcass is passed through a conventional dehairing machine $b$ wherein it is subjected to washing and beating in order to remove the hair. In practice, even in the most efficient machine, some hair is left on the carcass at the places where the skin is thickest. Next, the carcass is discharged onto a small table $c$. An operator then secures a gambrel-stick in and across the rear feet of the carcass and places the stick in a hook which is carried by a trolley $d$ on a track $e$ for delivery to a conveyor $f$. While the carcass is suspended on the track $e$, the operator places a rubber band around the snout or jaws and packs the nostrils with cotton to prevent the liquid in which the carcass is substantially immediately dipped from entering the mouth and nostrils of the carcass. The conveyor $f$ is of the driven type. It is provided with releasable devices or hooks $f'$ for successively engaging the trolleys and comprises a pair of laterally spaced chains $f^2$ which are adapted first to convey the carcass between them and horizontally to sprockets $g$, and then downwardly to sprockets $g'$ to dip the entire carcass, except the portion of the hind feet in which the gambrel-stick is secured, into a bath of molten adhesive type liquid $h$ in a dipping tank $i$. This liquid is in the form of a compound consisting of resin or pitch and about 7½ to 10% of soy bean oil or equivalent material. By using such materials the compound is unaffected by the moisture on the hog carcass.

Heating coils $i^2$ constantly maintain the temperature of the compound between 300 and 305° F. From the dipping tank the conveyor chains $f^2$ pass obliquely and upwardly to sprockets $g^2$ to lift the carcass out of the bath in the tank and then horizontally to sprockets $g^3$ where the trolley $d$, on which the carcass is suspended, will be delivered onto a track $k$ along which it is moved by endless conveyor chains $l$. In practice, immersion of approximately one minute will be sufficient to heat the carcass and cause a thin coating approximately $\frac{1}{16}''$ in thickness to remain on and completely envelop the carcass. After the carcass reaches the track $k$ and has traveled thereover a measurable distance, the coating will be cooled to approximately 140° F., which will be sufficiently low to permit an operator with wet gloves to handle the coating. An operator for initiating the removal of the coating, stands on a platform $l'$ where the hind legs of the carcass are within his reach. This operator passes both hands along the inner sides of the hind legs to the crotch to sever the portions of the coating along the inner sides of the legs and then folds the coating which is still in a tacky, soft or plastic condition, over the hind portion of the carcass and until the hind portion of the coating has been loosened and droops from the middle of the carcass. Next, a second operator on the floor $n$ beyond the platform $l'$ pulls the coating, while it remains integral and plastic, downwardly until the entire coating is drawn from the body over the head and forefeet and off the carcass. The drip from the carcass before the coating is removed and the removed coating drop or are deposited into a trough $m$ from which they are discharged through spouts $m'$ into a melting tank $o$ below the working floor $n$. The tank $o$ is provided with suitable heating coils for maintaining the coating material at a temperature of about 325° to 330° F., to allow for heat losses in keeping the liquid in circulation and at a temperature of 300° to 305° F. in the dripping tank $i$. The hot liquid compound is forced from tank $o$ by pumps $p$ through a pipe $p'$ which discharges it into the dipping tank $i$. An over-flow pipe $q$ maintains the liquids in the dipping tank at the desired level. The hot coating material is circulated continuously from the melting tank $o$, in which it is kept at a temperature of approximately 325° F., to the dipping tank for the purpose of maintaining a temperature of 300° to 305° F. in the dipping tank. Vertical screens $o^2$ are provided in the melting tank. The material in tank $o$ is periodically cleaned by raking the floating matter removed from the carcasses into a separate heated trough $r$ along one side of the melting tank.

In practice, it has been discovered that the condition and quality of the meat in a hog carcass, after it has passed through the dehairing machine to remove the hair and scurf which can be removed by the beaters of the dehairing machine and under the usual scalding temperature (138° F.) of the water used in the machine, can be improved by treatment of the carcass according to the present invention. In this treatment, the carcass is completely enveloped or hermetically sealed by or with a suitable adhesive liquid at a sufficiently high temperature, for example, 300° F., and in the presence of moisture between the coating and the skin of the carcass to achieve the desired result. After the carcass leaves the dehairing machine, some hair, and particularly in those places where the skin is of unusual thickness, remains on the carcass, the roots of some of the hair remain in the follicles in the carcass, the sebaceous glands retain sebum, the follicles contain debris and dirt and some bacteria organisms. The sebum in the glands consists of fats and fatty acids, cholesterin crystals, chlorides and phosphates of the alkaline earths, organic salts, albuminoids, water and occasionally butyric or caproic acids and mixed with these are epidermal nuclei, and debris of cells.

One result achieved by the method of the invention is that all or most of these matters which are undesirable in the meat which is derived from the carcass, are eliminated and thereby the quality of the product as a food is greatly improved. The coating of a moist carcass with the envelope of adhesive liquid at a temperature of approximately 300° F. digests or breaks down the undesirable matter in the follicles on the skin, causes the roots and remnants of hair to be exuded or loosened and to adhere to the coating, effects a sterilization of the skin and causes the sebum in the sebaceous glands and the debris and dirt in the follicles to be exuded so they pass between the adhesive envelope and the skin. This high degree of heat which is developed between the adhesive coating and the skin vaporizes the moisture into steam which aids in cooking or digesting and exuding all matters from the follicles and glands to bring the undesirable matter to the surface of the skin, from which any of the matter which does not adhere to the coating, can be readily removed by washing, particularly the oil or fat and acid exuded from the glands. Additionally, the heat of high degree and vaporized moisture or steam penetrate the follicles containing hair which has not been removed in the dehairing machine and which is usually found in places where thick skin is present, such as portions of the head, neck, feet and shoulders. The effect of the high degree of heat with moisture is particularly effective and important with the hair found in the thick portions of the skin because of the greater depth of the follicles and at the bottom of which are found the roots of the hair firmly attached to the surrounding tissues. In these instances the connected tissue between the hair and the skin, as well as the roots, are not effectively broken down for the removal of the hair in the dehairing machine or at the scalding temperature of approximately 138° F. This high temperature of the adhesive coating is also sufficient to cause the sebum to be exuded through the ducts of the sebaceous glands and follicles to the outer surface of the skin, which result is not attained during the conventional dehairing treatment of the carcass. The fats from the glands which reach the outer surface of the skin and the presence of moisture or steam between the adhesive coating and the skin, make it possible to subject the skin to this high temperature without causing excessive digestion of the skin which reduces its value for food purposes. The fatty substance between the skin and the coating also prevents the coating from adhering to the skin, particularly while the coating is plastic or sticky so that the coating can be freely and readily peeled off from the skin while the hairs adhere to the coating and are removed therewith.

By pulling the coating off the carcass while the coating is still plastic, some suction is created which aids in drawing the matter from the glands and follicles to the outer surface of the skin, and this is believed to be an important advantage resulting from the removal of the coating before it has set or become brittle. This treatment results in improving the condition and quality of the meat in the carcass through the elimination of the undesirable matters, as well as a more complete and thorough removal of the hair and roots, and in providing a method by which the depilatory or adhesive liquid is removed while it is hot and plastic to expedite and permit the free and complete removal of the coating without beating or scraping.

It has been found also that in practice the heat and steam to which the skin is subjected, according to the present method, loosen the surface epithelial cells, which were in a dead or dying state, so that they are separated from underlying cells, and so that they will be removed with other objectionable matter. An important result of the removal of these cells is that when the meat is smoked for hams or bacon, the skin or rind is of a higher quality and in a better condition on account of the removal of the objectionable matter, including the complete removal of the hair and roots, the skin is more edible, of a higher quality, and of much better and uniform appearance.

I am aware that it has heretofore been proposed to spray a carcass or to dip it in a depilatory liquid for the purpose of removing hair remaining in or on the skin after the carcass has been partially dehaired but the heat and moisture used were insufficient to remove the undesirable debris or to cause the sebum to be exuded or to cook and sterilize the other undesirable matter. In prior methods proposed, the coating was chilled on the carcass and the compound became brittle and hard, which rendered it difficult to remove. The temperature and moisture were lacking to cause the sebum to be exuded to the outer surface of the skin so that the coating could be freely and integrally peeled off the carcass. On account of the failure of that treatment to remove, cook or sterilize the undesirable matter and the resultant difficulty of removing the coating after it has become hard or brittle, this proposed practice has never been generally or commercially adopted or successful.

The invention is not to be understood as restricted to the details set forth, since these may be modified within the scope of the appended claims without departing from the spirit and scope of the invention.

Having thus described the invention, what I claim as new and desire to secure by Letters Patent is:

1. That improvement in the treatment of a hog carcass which comprises first applying an appreciable amount of moisture to the carcass, then substantially immediately thereafter dipping the moistened carcass in a molten, readily congealable, adhesive liquid for a sufficient length of time to form a substantially complete seal-like coating therearound and at a sufficient temperature to change the moisture on and in the skin of the carcass into steam, then cooling the coating to a plastic state, and finally removing the plastic coating from the carcass so as to release the matter loosened from the skin by the steam and also remove the hair embedded in the coating.

2. That improvement in the treatment of a hog carcass which comprises first applying an appreciable amount of moisture to the carcass, then substantially immediately thereafter dipping the moist carcass in a molten resinous compound at a temperature of approximately 300° F. in order to form a substantially complete seal-like coating therearound and also change the moisture under the coating and on and in the skin of the carcass into steam, then cooling the coating to a plastic state, and finally peeling the plastic coating from the carcass so as to release the matter loosened from the skin by the steam and also remove the hair embedded in the coating.

3. That improvement in the treatment of a hog carcass which comprises first moistening and machine dehairing the carcass, then substantially immediately thereafter and while the carcass is in a well moistened condition, dipping the carcass in a molten readily congealable adhesive liquid unaffected by the moisture for a sufficient length of time to form a substantially complete seal-like coating therearound and at a sufficient temperature to change the moisture on and in the skin of the carcass into steam, then cooling the coating to a plastic state, and finally removing the plastic coating from the carcass so as to release the matter loosened from the skin by the steam and also remove the hair remaining on the carcass after the machine dehairing step.

4. That improvement in the treatment of a hog carcass which comprises first scalding and machine dehairing the carcass, then substantially immediately thereafter and while the carcass is in a well moistened condition, dipping the carcass in a molten resinous compound at a temperature of no less than 300° F. in order to form a substantially complete seal-like coating therearound and also change the moisture under the coating and on and in the skin into steam, then allowing the coating to cool to a plastic state, and finally removing the plastic coating from the carcass in order to release the matter loosened from the skin by the steam and also remove the hair remaining on the carcass after the machine dehairing step.

5. That improvement in the treatment of a hog carcass which comprises first wetting and machine dehairing the carcass, then substantially immediately thereafter and while the carcass is in a well moistened condition, dipping the carcass in a molten resinous compound at a temperature of approximately 300° F. in order to change a substantially complete seal-like coating therearound and also form the moisture under the coating and on and in the skin into steam, then cooling the coating to approximately 140° F. to make it plastic, and finally peeling the plastic coating from the carcass in order to release the matter loosened from the skin by the steam and also remove the hair remaining on the carcass after the machine dehairing step.

6. That improvement in the treatment of a hog carcass which comprises first applying an appreciable amount of moisture to the carcass, then substantially immediately thereafter plugging the nostrils and securing together the jaws of the carcass, then directly thereafter dipping the moist carcass in a molten, readily congealable adhesive liquid for a sufficient length of time to form a substantially complete seal-like coating therearound and at a sufficient temperature to change the moisture on and in the skin of the carcass into steam, then cooling the coating to a plastic state, and finally removing the plastic coating from the carcass so as to release the matter loosened from the skin by the steam and also remove the hair embedded in the coating.

7. That improvement in the treatment of a hog carcass which comprises first moistening and machine dehairing the carcass, then substantially immediately thereafter plugging the nostrils and securing together the jaws of the carcass, then dipping the moistened carcass in a molten resinous compound at a temperature of approximately 300° F. in order to form a substantially complete seal-like coating therearound and also change the moisture under the coating and on and in the skin into steam, then allowing the coating to cool to a plastic state, and finally removing the plastic coating from the carcass so as to release the matter loosened from the skin by the steam and also remove the hair remaining on the carcass after the machine dehairing step.

8. That improvement in the treatment of a hog carcass which comprises taking the carcass substantially immediately after scalding and machine dehairing thereof and while in a well moistened condition and plugging the nostrils and securing together the jaws, then directly thereafter dipping the moistened carcass in molten resinous compound at a temperature no less than 300° F. in order to form a substantially complete seal-like coating therearound and also change the moisture under the coating and on and in the skin into steam, then allowing the coating to cool to approximately 140° F. in order to make it plastic, and finally peeling the plastic coating from the carcass so as to release the matter loosened from the skin by the steam and also remove the hair remaining on the carcass after the machine dehairing step.

FREDERICK M. TOBIN.